(12) United States Patent
Pistor

(10) Patent No.: US 7,005,778 B2
(45) Date of Patent: Feb. 28, 2006

(54) APPARATUS FOR SUPPLYING POWER TO A SENSOR

(75) Inventor: Klaus Pistor, Linden (DE)

(73) Assignee: Enocean GmbH, Oberhaching (DE)

( * ) Notice: Subject to any disclaimer, the term of this patent is extended or adjusted under 35 U.S.C. 154(b) by 122 days.

(21) Appl. No.: 10/629,949

(22) Filed: Jul. 30, 2003

(65) Prior Publication Data

US 2004/0055293 A1 Mar. 25, 2004

Related U.S. Application Data

(63) Continuation of application No. PCT/DE02/00321, filed on Jan. 30, 2002.

(30) Foreign Application Priority Data

Jan. 30, 2001 (DE) ................................ 101 03 952

(51) Int. Cl.
*H01L 41/08* (2006.01)
(52) U.S. Cl. ....................... 310/328; 310/8.3
(58) Field of Classification Search ................ 310/8.3, 310/328, 330, 332, 339; 60/527; H01L 41/08
See application file for complete search history.

(56) References Cited

U.S. PATENT DOCUMENTS

| | | | | |
|---|---|---|---|---|
| 3,699,296 | A | * | 10/1972 | Harris .......................... 200/453 |
| 3,800,104 | A | * | 3/1974 | Lien et al. ................... 200/5 A |
| 3,862,402 | A | * | 1/1975 | Igarashi et al. ................. 377/8 |
| 3,976,899 | A | * | 8/1976 | Fanshawe .................... 310/339 |
| 4,412,355 | A | | 10/1983 | Terbrack et al. |
| 4,471,353 | A | | 9/1984 | Cernik |
| 4,844,564 | A | * | 7/1989 | Price et al. ................. 312/9.46 |
| 4,868,566 | A | | 9/1989 | Strobel et al. |
| 4,870,700 | A | | 9/1989 | Ormanns et al. |
| 5,245,245 | A | * | 9/1993 | Goldenberg ................. 310/330 |
| 5,801,475 | A | | 9/1998 | Kimura |
| 5,844,516 | A | | 12/1998 | Viljanen |

FOREIGN PATENT DOCUMENTS

| | | |
|---|---|---|
| DE | 2 338 314 | 2/1974 |
| DE | 2 362 204 | 7/1974 |
| DE | 36 43 236 C2 | 7/1988 |
| DE | 44 01 923 A1 | 7/1995 |
| DE | 44 25 078 A1 | 1/1996 |
| DE | 689 25 624 T2 | 2/1996 |
| DE | 296 22 369 U1 | 6/1997 |
| DE | 196 01 917 A1 | 7/1997 |
| WO | 98/36395 | 8/1998 |

* cited by examiner

*Primary Examiner*—Darren Schuberg
*Assistant Examiner*—Karen Addison
(74) *Attorney, Agent, or Firm*—Laurence A. Greenberg; Werner H. Stemer; Ralph E. Locher

(57) ABSTRACT

An apparatus for supplying power, for example, to a sensor, has a passive piezoelectric transducer that can be deformed by a mechanical energy storage device. The transducer supplies a corresponding electrical voltage to operate the sensor. The piezoelectric transducer can be bent by deformation work that is emitted from the energy storage device.

14 Claims, 1 Drawing Sheet

APPARATUS FOR SUPPLYING POWER TO A SENSOR

CROSS-REFERENCE TO RELATED APPLICATION

This application is a continuation of copending International Application No. PCT/DE02/00321, filed Jan. 30, 2002, which designated the United States and was not published in English.

BACKGROUND OF THE INVENTION

Field of the Invention

The invention relates to an apparatus for supplying energy, for example, to a sensor. The apparatus includes a deformable piezoelectric transducer for supplying an electrical voltage.

An apparatus such as this is known from International Publication WO 98/36395. The known apparatus describes a wire-free switch that uses process energy from finger pressure to produce a piezovoltage. A coding that corresponds to the ambient temperature can be applied to the radio-frequency signal that is produced by the switch. Furthermore, a mechanical operating apparatus with a beyond dead center spring can be used to produce a high piezovoltage and which, when loaded beyond the dead point, acts suddenly on the transducer with the mechanical prestress that has been set.

SUMMARY OF THE INVENTION

It is accordingly an object of the invention to provide an apparatus of the type mentioned initially which, in a simple manner, converts available process energy to electrical energy for operating a sensor.

With the foregoing and other objects in view there is provided, in accordance with the invention, an apparatus for supplying power. The apparatus includes a mechanical energy storage device and a deformable-piezoelectric transducer for supplying an electrical voltage upon being bent by deformation work emitted by said mechanical energy storage device.

The invention uses a piezoelectric transducer that can be bent by the mechanical energy which is emitted from the energy storage device, in particular in the form of deformation work. The deformation of the piezoelectric transducer causes a shift in the positive and negative charge centroids in the piezoelectric material, and this is used as an electrical voltage, in particular for operating the sensor.

The piezoelectric transducer is designed to be passive, that is to say it does not itself produce any significant deformation work for operating the apparatus, but is used primarily for electromechanical energy conversion. Energy is in this case typically introduced into the energy storage device from the outside, for example by a mechanical operation on the energy storage device, and is emitted to the transducer at another point in the energy storage device.

This results in an energy-autonomous sensor which uses available process energy to obtain the energy that is required for its own operation, that is to say for carrying out measurements and for transmitting the measurement variables. The process energy may in this case be, for example, mechanical energy that is applied during operation of a switch that is coupled to the mechanical energy storage device, and that is converted to electrical energy by the piezoelectric transducer.

The transducer is preferably formed as a bending transducer, in which case one end of the transducer can be bent with respect to another end that is held fixed. The end of the transducer that can be bent can preferably be bent in two opposite directions. It is particularly advantageous for the bending transducer to be in the form of a rod having opposite rod ends.

The transducer may be composed of two or more piezoelectric partial elements, which are connected in series or in parallel. The crystal structure of the piezoelectric material is arranged such that, when the transducer is bent, this results in as great a charge separation as possible, that is to say a shift in the positive and negative charge centroids in the piezoelectric material. The transducer can preferably be bent between two end positions.

The energy storage device that is used for storing the process energy may be designed such that it emits the stored energy in the form of deformation work to the transducer when the storage capacity is exceeded. The storage capacity of the energy storage device may be defined as the switching point when, for example, a connected sensor is used as a switch or switching element, in particular as a remote radio switch without a battery.

The energy storage device is preferably in the form of a mechanical energy storage device, for example, a mechanical or pneumatic spring. The storage capacity of this spring is preferably predetermined by a dead point. Passing beyond this dead point results in the stored process energy being released and transmitted as deformation work to the energy converter.

While the process energy is acting on the energy storage device, this energy is temporarily stored without any deformation work being carried out on the transducer. The storage continues until the storage capacity is reached. The stored energy is then emitted in a short time in order to bend the transducer when the storage capacity is exceeded, that is to say at the dead point of the spring. The bending of the transducer therefore does not depend on the profile or on the influence of the process energy. The deformation work on the transducer is, in fact, carried out on the transducer at a defined time or switching point. The process energy can also be temporarily stored in the form of weight.

The operation of the energy storage device is not restricted; it can thus be switched directly manually, via a mechanical coupling apparatus or via other movable elements such as thermomechanical elements. It can also be deformed via a coupling other than the mechanical coupling, for example by an electromechanical, magnetic, electrostatic, magnetostrictive or electrostrictive coupling.

Other features which are considered as characteristic for the invention are set forth in the appended claims.

Although the invention is illustrated and described herein as embodied in an apparatus for supplying power to a sensor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
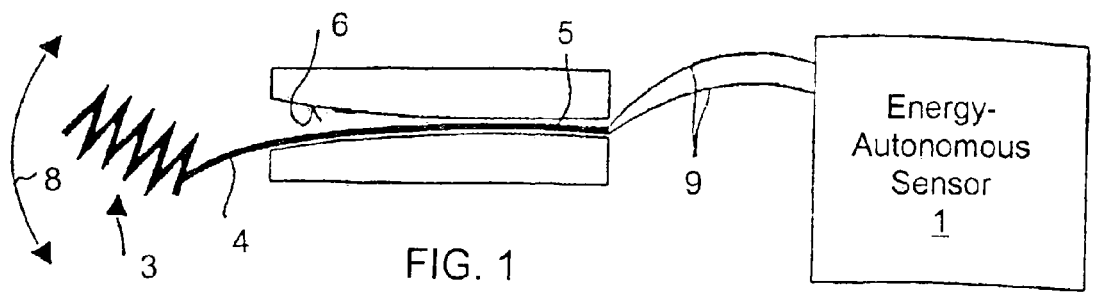
FIG. 1 is a schematic drawing of an exemplary embodiment of the invention.

Referring now to the figures of the drawing in detail and first, particularly, to FIG. 1 thereof, there is schematically shown, an exemplary embodiment of the invention. There is a sensor 1 that can detect measurement variables, for example, temperature, pressure and the like, and passes these measurement variables by radio, for example, to an evaluation device which is not illustrated in any more detail. The sensor 1 may also be in the form of a switch, in particular, a remote radio switch without a battery.

In order to supply energy to the sensor 1, available process energy is converted to electrical energy, in particular to an electrical voltage, which is used for operation of the sensor. A piezoelectric transducer 2 in the form of a rod or with a similar elongated shape, for example in the form of a platelet, is provided for this purpose. One rod end 5 of the piezoelectric transducer 2 is clamped in firmly, while it is designed such that it can bend at its other rod end 4. The transducer (bending transducer) may be composed of two or more piezoelectric partial elements, which are connected in series or in parallel. When the transducer 2 is bent, positive and negative charge centroids are shifted as a result of the piezoelectric effect in the piezoelectric material. This results in an electrical voltage (piezovoltage) being produced on the transducer 2, and this is used for operation of the sensor 1.

The transducer 2 is designed such that it can be bent in both directions between two end positions, which are defined by mutually opposite contact surfaces 6. The contact surfaces 6 make it possible to achieve an optimum bending profile. The contact surfaces 6 may be provided on the apparatus which is used to fix the first rod end 5.

Figure 2A:
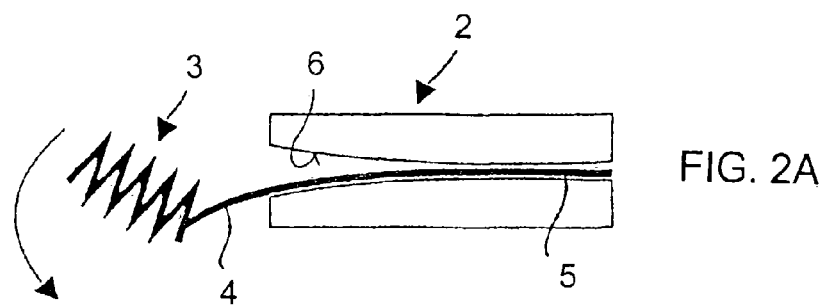
FIGS. 2A–2C are are schematic drawings showing various operating positions of the exemplary embodiment.
Figure 2B:
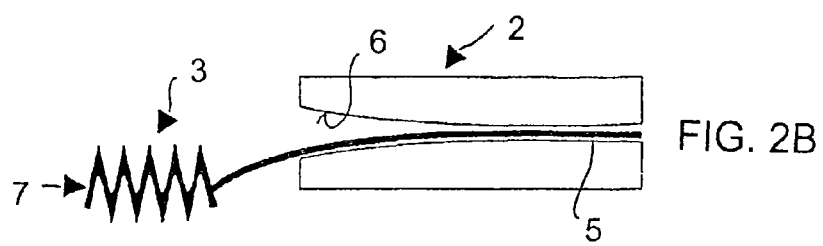
Figure 2C:
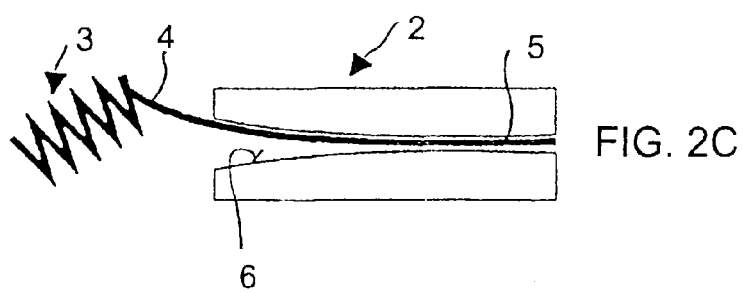

The energy storage device 3, which is used for-temporarily storing the process energy, is preferably designed such that it has a specific storage capacity. When this storage capacity is exceeded, the stored process energy is emitted in the form of deformation work to the transducer 2, so that the transducer 2 is bent. In the illustrated exemplary embodiment, a mechanical spring-which has a dead point 7 (FIG. 2B) is used for this purpose. The mechanical dead point 7 defines the storage capacity of the energy storage device 3, which is in the form of a spring. The process energy which acts on the spring, for example the mechanical energy which is applied in order to operate a switch, is stored, thus resulting in the spring becoming increasingly stressed. This operating state is illustrated in FIG. 2A. The rod end 4 which can be bent remains in its stable end position, which is illustrated in FIGS. 2A and 2B until the spring reaches its mechanical dead point 7. When it passes beyond the mechanical dead point 7, that is to say when the storage capacity is exceeded, the power which is stored in the spring is emitted in a short time as deformation work to the transducer 2, and this results in each rod end 4, which can be bent, being bent to the other end position, which is located at the top as illustrated in FIG. 2C. The two end positions for the bending transducer are governed by the contact surfaces 6, in the illustrated exemplary embodiment.

The double-headed arrow 8, which is shown in FIG. 1, shows the operating directions of the process energy acting on the spring (energy storage device 3). According to this, the rod end 4 of the piezoelectric transducer 2 which can be bent is moved in both directions between the two end positions. The rod end 4 which can be bent in this case remains in its respective initial position until the dead point 7, that is to say the storage capacity of the spring which forms the energy storage device 3, is exceeded, and the stored energy is transferred as deformation work to that rod end 4 which is bent around the other end position.

This results in an energy supply that is obtained from available process energy for a sensor 1, which is made to be energy-autonomous, with relatively high efficiency. A compact design can be achieved for the arrangement of the piezoelectric transducer 2 and of the energy storage device 3. When a spring is used as the energy storage device 3, this results in the dead point position of the spring forming a switching point that is mechanically defined in a simple manner for producing the electrical energy that is required for operation of the sensor.

Figure 3:
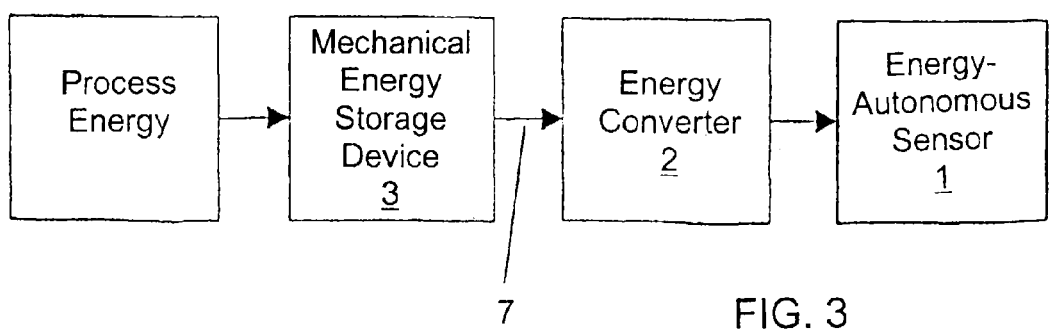
FIG. 3 is a flowchart for explaining the operation of the exemplary embodiment.

As can be seen from FIG. 3, the process energy in the illustrated exemplary embodiment is stored in an energy storage device, in particular a mechanical energy storage device, until the storage capacity of the energy storage device 3 is reached. When using a mechanical spring, this storage capacity may be defined by the dead point 7. When the storage capacity is exceeded, or the energy storage device moves beyond the dead point 7, deformation work is released from the energy storage device in order to bend the piezoelectric transducer. The shift in the positive and negative charge centroids that result from this in the piezoelectric material results in the electrical energy source for operation of the sensor 1, which is made to be energy-autonomous in this way. The sensor 1 is connected to the transducer 2 via an electrical connection 9. The storage capacity and the dead point 7 may in this case act as a defined switching point or switching time. One preferred application for the apparatus is for a remote radio switch without a battery.

I claim:

1. An apparatus for supplying power, comprising:
    a mechanical energy storage device;
    a deformable piezoelectric transducer for supplying an electrical voltage upon being bent by deformation work emitted by said mechanical energy storage device;
    a contact surface separate from said mechanical energy storage device; and
    said transducer being bendable along said contact surface, forming a bend in said transducer being defined by said contact surface.

2. The apparatus according to claim 1, wherein said transducer is a rod with a first end that is fixedly held and a second end that can be bent with respect to said first end.

3. The apparatus according to claim 1, wherein said transducer is a rod with a first end that is fixedly held and a second end that can be bent in two opposite directions with respect to said first end.

4. The apparatus according to claim 1, wherein said transducer is formed from at least two piezoelectric partial elements that are connected in series.

5. The apparatus according to claim 1, wherein said transducer is formed from at least two piezoelectric partial elements that are connected in parallel.

6. The apparatus according to claim 1, wherein said transducer is bendable between two end positions.

7. The apparatus according to claim 1, wherein said energy storage device stores available process energy.

8. The apparatus according to claim 1, wherein said energy storage device has a storage capacity and when said storage capacity of said energy storage device is exceeded, said transducer is supplied with said deformation work as energy emitted by said energy storage device.

9. The apparatus according to claim 8, wherein said storage capacity of said energy storage device defines a switching point.

10. The apparatus according to claim 1, wherein said deformation work is transferred from said energy storage device to said transducer in a short time.

11. The apparatus according to claim 1, wherein said energy storage device is a spring.

12. The apparatus according to claim 11, wherein said spring has a dead point.

13. The apparatus according to claim 12, wherein:

said transducer is bendable between two end positions;

one of said end positions located on one side of said dead point; and another one of said end positions located on another side of said dead point.

14. The apparatus according to claim 1, in combination with a sensor being supplied with the power from the apparatus.

* * * * *